United States Patent
Hofmann et al.

(10) Patent No.: US 8,147,892 B2
(45) Date of Patent: *Apr. 3, 2012

(54) KOKUMI FLAVOUR COMPOUNDS AND USE

(75) Inventors: Thomas Frank Hofmann, Neufahrn (DE); Andreas Dunkel, Freising (DE)

(73) Assignee: Givaudan SA, Vernier (CH)

( * ) Notice: Subject to any disclaimer, the term of this patent is extended or adjusted under 35 U.S.C. 154(b) by 941 days.

This patent is subject to a terminal disclaimer.

(21) Appl. No.: 12/089,625

(22) PCT Filed: Oct. 11, 2006

(86) PCT No.: PCT/EP2006/009817
§ 371 (c)(1),
(2), (4) Date: May 20, 2008

(87) PCT Pub. No.: WO2007/042273
PCT Pub. Date: Apr. 19, 2007

(65) Prior Publication Data
US 2008/0248175 A1    Oct. 9, 2008

(30) Foreign Application Priority Data
Oct. 14, 2005    (GB) .................................. 0520842.6

(51) Int. Cl.
*A23L 1/22*    (2006.01)

(52) U.S. Cl. ......... 426/534; 426/533; 426/535; 426/650
(58) Field of Classification Search .................. 426/533, 426/534, 535, 650
See application file for complete search history.

(56) References Cited

U.S. PATENT DOCUMENTS
2006/0083847 A1    4/2006    Iwasaki

FOREIGN PATENT DOCUMENTS
| EP | 1619201 A1 | 1/2006 |
|---|---|---|
| JP | 11215967 A | 8/1999 |
| JP | 2004041146 A | 2/2004 |
| KR | 2005014757 A | 2/2005 |
| WO | 2005019165 A | 3/2005 |

OTHER PUBLICATIONS
English Language Abstract for JP2004041146 taken from esp@cenet.com.
English Language Abstract for JP11215967 taken from esp@cenet.com.
English Language Abstract for KR20050014757 taken from esp@cenet.com.

*Primary Examiner* — Leslie Wong
(74) *Attorney, Agent, or Firm* — Norris McLaughlin & Marcus PA

(57) ABSTRACT

The invention relates to gamma-glutamyl and beta-asparagyl peptide compounds of formula (I) that provide a kokumi flavor to consumables and flavor compositions, and to consumables and flavor compositions comprising such compounds. Enzymatic methods to prepare the compounds are provided.

11 Claims, No Drawings

KOKUMI FLAVOUR COMPOUNDS AND USE

This is an application filed under 35 USC 371 of PCT/EP2006/009817.

This invention relates to the use of kokumi flavourant compounds in consumables, and to flavour compositions comprising such compounds.

"Kokumi" is a term used in the flavour industry to describe characteristics such as continuity, mouthfulness, richness and thickness. In contrast thereto, the sensory terms for the basic tastes are salty, sweet, sour, bitter or umami, the last-named being the taste of monosodium glutamate (MSG). Kokumi is a distinct taste quality, or rather a taste-enhancing quality, which can be easily detected and differentiated by sensory tests by a trained panel. Compounds that provide a kokumi taste are usually tasteless in water, but enhance the taste in combination with other tastants in respect of the above-mentioned qualities.

In addition to the desired organoleptic properties, compounds should preferably have one or more of the following characteristics: they should be inexpensive to produce, stable during long periods of storage and to processing conditions that may comprise elevated temperatures and humidity, and extremes of pH.

Applicant identified compounds according to formula I that belong to the group of gamma-glutamyl and beta-asparagyl peptides which are able to provide a "kokumi" flavour to consumables and fulfill the above requirements.

Whereas no literature information is available on sensory properties of beta-asparagyl peptides, certain gamma-glutamyl peptides are known to provide or change flavour properties. Gamma L glutamyl dipeptide-derivates of Phe, Val, Leu and His are known to reduce the bitterness of the original amino acids (Phe, Val, Leu, His) (Suzuki et al., J. Agric. Food Chem. 2002, 50, 313-318). Various sulphur containing peptides including alliin ((+)-S-allyl-L-cysteine sulfoxide), cycloalliin ((3-(S)-methyl-1,4-thiazane-5-(R)-carboxylic acid 1-oxide), MeCSO ((+)-S-methyl-L-cysteine sulfoxide), GACSO, (gamma-L-glutamyl-S-allyl-L-cysteine sulfoxide), GAC (gamma-L-glutamyl-S-allyl-L-cysteine sulfoxide), and GSH (Glutathione, Gamma-L-glutamyl-L-cysteinyl-glycine or γ-Glu-Cys-Gly) are known to impart a "kokumi" flavour to aqueous umami solutions containing monosodium glutamate (MSG) and ribonucleotides or to an aqueous model beef extract (Ueda et al. Agric. Biol. Chem. 1990, 54, 163-169; Ueda et al., Biosci. Biotech. Biochem. 1997, 61, 1977-1980).

There remains a need for alternative or improved compounds to provide a "kokumi" flavour to consumables.

Surprisingly, applicant has found that compounds of formula I are able to provide a kokumi flavour. This was entirely unpredictable from the prior art.

In a first aspect, the invention is therefore directed to the use as a flavour of a compound of formula I,

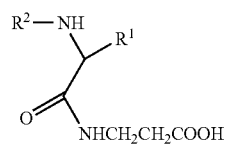

I wherein the residues $R^1$ and $R^2$ are selected as follows:
$R^1$ is a residue selected from the group consisting of —$CH_2SH$, —$CH_2CH_2SH$, and —$CH_2CH_2CH_2SH$, —$CH_2SCH_3$, —$CH_2CH_2SCH_3$, and —$CH_2CH_2CH_2SCH_3$, —$CH_2$—S—$CH_2CH(NH_2)$—COOH, and —$CH_2S$—S—$CH_2(NH_2)$—COOH;
$R^2$ is a residue selected from the group of a residue of γ-Glu (—CO—$CH_2CH_2CH(NH_2)$—COOH), and β-Asp (—CO—$CH_2$—$CH(NH_2)$—COOH).
and wherein when $R^1$ comprises sulfur, the compound is a sulfide, or a disulfide formed of two different or identical compounds according to formula I linked via the sulfide groups in two $R^1$ residues.

These compounds include, for example, compounds of formula I wherein $R^1$ is selected from the group consisting of —$CH_2SH$, —$CH_2CH_2SH$, —$CH_2CH_2CH_2SH$; compounds of formula I wherein $R^1$ is —$CH_2SH$; compounds of wherein $R^1$ is selected from the group consisting of —$CH_2SCH_3$, —$CH_2CH_2SCH_3$, and —$CH_2CH_2CH_2SCH_3$; and compounds of formula I wherein $R^2$ is —CO—$CH_2$—$CH_2$—CH($NH_2$)—COOH.

In another aspect, the invention is directed to the use as a flavour of a compound of formula I wherein $R^2$ is —CO—$CH_2$—CH($NH_2$)—COOH.

In yet another aspect the invention is directed to a flavour composition comprising one or more compounds of formula I as hereinabove defined, or a mixture thereof.

In still another aspect the invention is directed to a consumable containing one or more compounds of formula (I) as hereinabove defined, or mixtures thereof, in a concentration of 1 to 25.000 ppm (weight/weight).

In another aspect the invention is directed to a method of imparting a kokumi flavour to a consumable, comprising the addition of one or more compounds as hereinabove defined to a consumable in a concentration sufficient to impart a kokumi taste. The compound may be added in form of an unpurified enzymatic reaction mixture in which it was formed, in form of a crude extract of such a mixture, in form of a plant extract, in form of a plant isolate, or in purified form.

Standard abbreviations for amino acids are used throughout this text to identify their residues within a larger compound rather than the free amino acid, for example $R^2$ above may be a residue of γ-Glu or β-Asp. For Cystein residues, sulfur groups may be explicitly indicated for the sulfide or disulfide (CySSH, Cys-S—S-Cys or (CySS)$_2$). All amino acid residues according to the invention are residues of L-amino acids.

A compound of formula I, Homoglutathione or hGSH (Gamma-L-glutamyl-L-cysteinyl-beta-alanine or γ-Glu-Cys-β-Ala) has been described to occur in leguminous plants and in transgenic plants, for example in transgenic tobacco plants that express soybean homoglutathione synthetase (Sugiyama et al. 2004, Plant Biotechnology 21, 79-83). However, compounds of formula I have not previously been used to impart a kokumi taste/taste enhancement or as flavours.

A compound of formula I may be present in the form as shown or in its ionic form with or without a counter-ion, for example its sodium, potassium, calcium, ammonium, chloride, sulfate, phosphate, carbonate salt, or similar. Alternatively or additionally, a compound of formula I may be present in the form as shown (reduced form), or alternatively it may be present in its oxidised form as a disulfite formed by two units of two different or identical compounds as shown in formula I linked via a disulfide bridge.

A preferred compound is hGSH. hGSH provides a strong kokumi taste (mouthfulness, complexity, richness) which is improved in intensity when compared to the prior art kokumi flavour compound GSH which leads to a strong consumer preference over the prior art compound. An even stronger kokumi taste is provided by these compounds if present in their reduced form.

Examples of compounds of formula I are listed below in table 1.

TABLE 1

Example compounds of formula I.

| | $R^1$ | $R^2$ |
|---|---|---|
| 1 hGSH γ-Glu-Cys-β-Ala | $CH_2SH$ | $COCH_2CH_2CH(NH_2)COOH$ |
| 2 β-Asp-Cys-β-Ala | $CH_2SH$ | $COCH_2CH(NH_2)COOH$ |
| 3 | $CH_2SCH_3$ | $COCH_2CH_2CH(NH_2)COOH$ |
| 4 | $CH_2SCH_3$ | $COCH_2CH(NH_2)COOH$ |
| 5 | $CH_2CH_2SH$ | $COCH_2CH_2CH(NH_2)COOH$ |
| 6 | $CH_2CH_2SH$ | $COCH_2CH(NH_2)COOH$ |
| 7 γ-Glu-Met-β-Ala | $CH_2CH_2SCH_3$ | $COCH_2CH_2CH(NH_2)COOH$ |
| 8 β-Asp-Met-β-Ala | $CH_2CH_2SCH_3$ | $COCH_2CH(NH_2)COOH$ |
| 9 | $CH_2CH_2CH_2SH$ | $COCH_2CH_2CH(NH_2)COOH$ |
| 10 | $CH_2CH_2CH_2SH$ | $COCH_2CH(NH_2)COOH$ |
| 11 | $CH_2CH_2CH_2SCH_3$ | $COCH_2CH_2CH(NH_2)COOH$ |
| 12 | $CH_2CH_2CH_2SCH_3$ | $COCH_2CH(NH_2)COOH$ |
| 13 | $CH_2-S-CH_2CH(NH_2)COOH$ | $COCH_2CH_2CH(NH_2)COOH$ |
| 14 | $CH_2-S-CH_2CH(NH_2)COOH$ | $COCH_2CH(NH_2)COOH$ |
| 15 | $CH_2-S-S-CH_2CH(NH_2)-COOH$ | $COCH_2CH_2CH(NH_2)COOH$ |
| 16 | $CH_2-S-S-CH_2CH(NH_2)-COOH$ | $COCH_2CH(NH_2)COOH$ |

In another aspect, the invention is directed to flavour compositions comprising one or more compounds of formula I as hereinabove defined.

In another aspect, the invention is directed to consumables comprising one or more compounds of formula (I) as hereinabove defined, or mixtures thereof, in a concentration of 1 to 25.000 ppm (weight/weight).

In another aspect, the invention is directed at a method for imparting a kokumi taste to a consumable, comprising the addition of a compound as hereinabove described to a consumable. The compound may be added in the form of an unpurified enzymatic reaction mixture in which it was formed, in the form of a crude extract of such a mixture, in the form of a plant extract, or in purified form.

Peptide compounds for use in the present invention may be prepared or isolated from botanical sources according to procedures well known in the art. For example, Neish and Rylett (1963), Tetrahedron 19, 2031-2032 describe the chemical synthesis of hGSH. Other compounds of formula I may be synthesized analogously using the appropriate source compounds as will be apparent to the skilled person. Alternatively, various well known peptide synthesis methods may be used. JP2004041146 describes the enzymatical synthesis of hGSH. Klapheck (1988), Physiologia Plantarum 74, 727-732 describes the isolation of hGSH from legumes. They may also be isolated from approprioate transgenic plants expressing an enzyme forming a compound of formula I, for example as described by Sugiyama et al. 2004, Plant Biotechnology 21, 79-83.

Certain γ-glutamyl dipeptides of formula I can also be prepared enzymatically using gamma-glutamyl-transpeptidase enzyme (GGTP) as is well known in the art using enzymes from various sources including commercial sources and described previously, for example, by Suzuki et al., J. Mol. Catal. 1999, B6, 175-184; Suzuki et al., J. Agric. Food Chem. 2002, 50, 313-318), Suzuki et al.; J. Agric. Food Chem.; 52 (2004); 577-580; Strumeyer and Bloch, Biochem. Prep. 1962, 9, 52-55; Thompson and Meister, Proc. Nat. Acad. Sci. USA, 1975, 72, 1985-1988; Allison and Meist J. Biol. Chem. 1981, 256, 2988-2992; Meister, The Enzymes B(Academi, New York), 3rd. Ed., Vol. 10, pp. 671-697; Strumeyer and Bloch, J. Biol. Chem. 1969, 235, 27; Thompson and Meister, Proc. Nat. Acad. Sci. USA, 1975, 72, 1985-1988; Oppenheimer et al., J. Biol. Chem. 1979, 254, 5184-5190; Tate and Meister, J. Biol. Chem., 1975, 250, 4619-4627.

Starting materials and the enzymes are readily available commercially or can be obtained as described in the references indicated above.

The formed products may be purified and used as a flavour in purified form, or they may be used as a flavour in crude form (enzymatic reaction mixture) or as a crude extract from fermentation or from enzymatic reaction with the isolated enzyme. Alternatively, a compound of formula I may be produced naturally by a botanical source, in particular a plant or leguminose plant, and this material, in particular a botanical extract or plant extract with a sufficiently high concentration of a compound of formula I, in particular hGSH, may be used. The concentration will vary depending on compound and desired intensity, as will be apparent to the skilled person. For most applications, a concentration of 0.1-50 mmol/L, in particular 0.5-20 mmol/L, or 1-10 mmol/L will be useful.

If so desired, the product may be purified as follows: lyophilisation, followed by chromatographic work-up, for example gel permeation chromatography may be employed. Chromatography may be performed, for example, with Sephadex G-10 (Amersham Bioscience, Uppsalla, Sweden) as stationary and water as mobile phase. The effluent is monitored, for example using an UV-detector at 220 nm. The product eluate can be confirmed by analytical methods well-known in the art, for example by liquid chromatography and mass spectrometry (LC-MS) and nuclear magnetic resonance (NMR) spectroscopy.

A compound for use in the present invention imparts a kokumi taste to consumables. Consumables as used herein include food products, beverages, oral care products, and compositions for admixture to such products, in particular flavour compositions. Flavour compositions may be added to processed foods or beverages during their processing, or they may actually be consumables in their own right, e.g. condiments such as sauces and the like.

A compound of the present invention or a mixture thereof may be used as a flavour ingredient in flavour compositions. A compound or mixture of compounds may be blended with other flavour ingredients in said compositions. A compound or mixture of compounds imparts a kokumi taste to all kinds of consumables, and is particularly interesting in savoury consumables.

Examples of consumables include cereal products, baker's products, bread products, gums, chewing gums, yeast products, salt and spice products, mustard products, vinegar products, sauces (condiments), soups, processed foods, cooked fruits and vegetable products, meat and meat products, egg products, milk and dairy products, cheese products, butter and butter substitute products, milk substitute products, soy products, edible oils and fat products, medicaments, beverages, alcoholic drinks, beers, soft drinks, food extracts, plant extracts, meat extracts, condiments, sweeteners, nutraceuticals, pharmaceutical and non-pharmaceutical gums, tablets, lozenges, drops, emulsions, elixirs, syrups and other preparations for making beverages, instant beverages and effervescent tablets.

The flavourant qualities of compounds of the formula (I) may be evident over a broad range of concentrations. For example, in the case of a food or beverage product, a compound or mixture of compounds may be present in a concentration ranging from, for example, 1 to 10.000 ppm, 5 to 25.000 ppm, 10 to 10.000 ppm, 50 to 5000 ppm, and 100 to 1000 ppm (based on weight). The skilled person will appreciate that the appropriate concentration will depend on the consumable, the presence of other flavours, and the desired kokumi intensity. The concentration can easily be adjusted by the skilled person to the desired effect.

A person skilled in the art will appreciate that formulations and consumables may contain additional ingredients which may comprise various additives and excipients well known in the art, including anti-caking agents, anti-foaming agents, anti-oxidants, binders, colorants, diluents, disintegrants, emulsifiers, encapsulating agents or formulations, enzymes, fats, flavour-enhancers, flavouring agents, gums, lubricants, polysaccharides, preservatives, proteins, solubilisers, solvents, stabilisers, sugar-derivatives, surfactants, sweetening agents, vitamins, waxes, and the like. Solvents which may be used are known to those skilled in the art and include e.g. ethanol, ethylene glycol, propylene glycol, glycerin, triacetin, diethyl phthalate and dimethyl phthalate. Encapsulants and gums include maltodextrin, gum arabic, alginates, gelatin, modified starch, and polysaccharides. Examples of additives, excipients, carriers, diluents or solvents for flavour or fragrance compounds may be found e.g. in "Perfume and Flavor Materials of Natural Origin," S. Arctander, Ed., Elizabeth, N. J., 1960; in "Perfume and Flavor Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

There now follows a series of non-limiting examples that serve to illustrate the invention.

EXAMPLES 1-4

Unless otherwise indicated, all sensory tests are triangle tests and are performed according to the guidelines in "Amtliche Sammlung von Untersuchungsverfahren nach §35 LMBG (Lebensmittel-und Bedarfsgegenständegesetz)"; L 00.90 7, Untersuchung von Lebensmitteln, Sensorische Prüfverfahren, Dreiecksprüfung (Übernahme der gleichnahmigen Deutschen Norm DIN ISO 4120, Ausgabe January 1995), as follows:

The sensory panel is trained to evaluate the taste of aqueous solutions (4 ml each) of the following standard taste compounds by using a triangle test as described in the literature (Wieser and Belitz, Z. Lebensm. Unters. Forsch., 1975, 159, 65-72): sucrose (40 mmol/L) for sweet taste; citric acid (5 mmol/L) for sour taste; NaCl (12 mmol/L salty taste; caffeine (2 mmol/L) for bitter taste; and monosodium glutamate (MSG; 6 mmol/L) for umami taste. For kokumi taste, a solution of glutathione (10 mmol/L) in diluted chicken broth concentrate (Goumet Bouillon Huhn, Maggi, Singen, Germany; 3 g/100 g bottled water (Evian®)) is prepared and compared to the taste of chicken broth with no glutathione added.

All sensory analyses are performed in a sensory panel room at 22-25° C. over three different sessions by a trained panel of 8 to 10 individuals.

For recording the taste profiles, samples are prepared as indicated in the examples below. Taste profiles of samples are determined in a triangle test in three different sessions. Panellists refrain from eating or drinking for at least 1 hour prior to the session. At the start of the session and before each trial, the subject rinsed with water and expectorated. The participants receive a set of two blanks and one taste sample. Liquid samples are swirled around in the mouth briefly and expectorated. Solid samples are chewed for 20 seconds and then expectorated. After indicating, which glass vial shows a different taste profile and description of the distinction, the participant receives another trial set of two blanks and one taste sample. Each sample with additive is compared to two reference samples without additives. Kokumi intensity is rated from 0-5 according to a scale from 0 to 5 (with 5 most intensive). The additive is added to a consumable and the sample is homogenised. The samples are presented to the sensory panel directly after homogenisation. The sensory panel included 8 trained individuals with exception of example 2, here the panel consists of 10 trained individuals.

Example 1

Sensory Effects of hGSH in Chicken Broth

Sensory tests (triangel test) are performed at least three times for each compound using sensory panels of different individuals to confirm results. GSH is determined to have an kokumi intensity of 3.5 in all tests.

Chicken Broth is prepared by dilution of 3 g chicken broth concentrate (Gourmet Bouillon Huhn; Maggi, Singen, Germany) with 100 ml water (Evian). Additives are added as specified in table below.

The pH-value of all samples is adjusted to 6.5 using formic acid (0.1 moVL) or sodium hydroxide (0.1 mol/L).

The results of the tests are indicated in the table below. For each sample, kokumi intensity is rated and panelists are asked to describe sensory characteristics.

| Chicken broth samples | concentration of additive | Kokumi intensity (0-5) | Sensory descriptors |
| --- | --- | --- | --- |
| Negative control (without additives) | — | 2 | — |
| Positive control: NaCl | 30 mmol/L | 2 | increased salt taste |
| Positive control: MSG (mono sodium glutamate) | 10 mmol/L | 2 | Increased umami taste |
| GSH, reduced form [γ-Glu-Cys-Gly] | 10 mmol/L | 3.5 | Increased complexity and mouthfulness (kokumi), more rich, more impact, punch |
| GSH, oxidized form (disulfide) | 10 mmol/L | 2.5 | slight increase of mouthfulness and complexity (kokumi) |
| hGSH (γ-Glu-Cys-β-Ala) | 10 mmol/l | 4.0 | Strong increase of mouthfulness and more complex (kokumi), long lasting, more pronounced than GSH |

The following compounds have been tested as described above and are found not to have a kokumi taste: the amino acids Asp, Asn, Glu, Gln, Ala, β-Ala, Cys, and the disulfide [Cys-S—S-Cys, (CySS)2].

The panel rates the positive control with NaCI more salty than the negative control and the positive control with MSG as having the higher umami (taste of MSG) intensity, but no effect on mouthfulness and complexity of the taste profile is observed.

The hGSH sample increases the mouthfulness, complexity, and long lasting taste sensation of chicken broth.

Example 2 hGSH in Cream Cheese hGSH is added to Cream cheese (Philadelphia, Kraft) to a final concentration of 1000 pppm. The mixture is stirred until homogeneous.

| Cheese cream samples | Test results |
| --- | --- |
| Reference without additives | — |
| hGSH (γ-Glu-Cys-β-Ala), 1000 ppm | Different from reference, more mouthfulness, richness, and kokumi-like complexity. |

9 out of a panel of 10 find the hGSH sample (γ-Glu-Cys-β-Ala) different from the reference sample and preferred. The hGSH sample is described to possess more mouthfulness, richness, and kokumi-like complexity.

Example 3

Glutathione and Homoglutathione in Tomato Juice

Glutathione and homoglutathione are added to tomato juice (Albi, Germany) in the concentrations indicated below.

| Tomoatoe juice samples | Test results |
| --- | --- |
| Reference without additives | — |
| GSH (γ-Glu-Cys-Gly) 5000 ppm | Preferred, more intensive, well balanced and aromatic kokumi taste |
| γ-Glu-Cys-β-Ala 250 ppm | Preferred, more intensive, well balanced and aromatic kokumi taste |
| γ-Glu-Cys-β-Ala 5000 ppm | Preferred, more intensive, well balanced and aromatic kokumi taste, more pronounced when compared to γ-Glu-Cys-β-Ala 250 ppm and GSH 5000 ppm |

γ-Glu-Cys-β-Ala 250 ppm is preferred by 7 out of 8 panelists, and is described as having a more intensive and well-balanced kokumi taste. This effect is increased with ascending concentrations.

γ-Glu-Cys-β-Ala 5000 ppm shows an even more pronounced kokumi sensation compared to an isoconcentrated glutathione sample.

Example 4

Glutathione and Homoglutathione in Ketchup

Glutathione (GSH) and homoglutathione (hGSH) are added to ketchup (Kraft) in a concentration of 2500 ppm.

| Ketchup samples | Test results |
| --- | --- |
| Reference without additives | — |
| GSH (γ-Glu-Cys-Gly) | More meaty, bouillon-like, and intensified overall taste. |
| hGSH (γ-Glu-Cys-β-Ala) | More meaty, bouillon-like, and intensified overall taste. Greater effect than GSH. | hGSH is indicated by 7 out of 8 panelists to have a more meaty, bouillon-like, and intensified overall taste. GSH is described similar than sample 3, but the observed effect is lower.

Example 5

Sensory Effects of Compounds of Formula I in Chicken Broth

Compounds of formula I as listed in the table below are tested in chicken broth (prepared as described in example 1) and compared to hGSH. The sample compounds provide a similar kokumi taste as hGSH.

|   | R¹ | R² |
|---|---|---|
| 1 hGSH γ-Glu-Cys-β-Ala | CH₂SH | COCH₂CH₂CH(NH₂)COOH |
| 2 β-Asp-Cys-β-Ala | CH₂SH | COCH₂CH(NH₂)COOH |
| 3 | CH₂SCH₃ | COCH₂CH₂CH(NH₂)COOH |
| 4 | CH₂SCH₃ | COCH₂CH(NH₂)COOH |
| 5 | CH₂CH₂SH | COCH₂CH₂CH(NH₂)COOH |
| 6 | CH₂CH₂SH | COCH₂CH(NH₂)COOH |
| 7 γ-Glu-Met-β-Ala | CH₂CH₂SCH₃ | COCH₂CH₂CH(NH₂)COOH |
| 8 β-Asp-Met-β-Ala | CH₂CH₂SCH₃ | COCH₂CH(NH₂)COOH |
| 9 | CH₂CH₂CH₂SH | COCH₂CH₂CH(NH₂)COOH |
| 10 | CH₂CH₂CH₂SH | COCH₂CH(NH₂)COOH |
| 11 | CH₂CH₂CH₂SCH₃ | COCH₂CH₂CH(NH₂)COOH |
| 12 | CH₂CH₂CH₂SCH₃ | COCH₂CH(NH₂)COOH |
| 13 | CH₂—S—CH₂CH(NH₂)COOH | COCH₂CH₂CH(NH₂)COOH |
| 14 | CH₂—S—CH₂CH(NH₂)COOH | COCH₂CH(NH₂)COOH |
| 15 | CH₂—S—S—CH₂CH(NH₂)—COOH | COCH₂CH₂CH(NH₂)COOH |
| 16 | CH₂—S—S—CH₂CH(NH₂)—COOH | COCH₂CH(NH₂)COOH |

The invention claimed is:

1. A method for imparting a flavour to a consumable, comprising the addition to the consumable of at least one flavouring compound according to the formula (I), or a salt thereof,

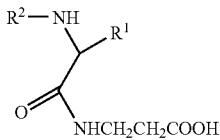

Wherein:
R¹ is a residue selected from the group consisting of: —CH₂SH, —CH₂CH₂SH, —CH₂CH₂CH₂SH, —CH₂SCH₃, —CH₂CH₂SCH₃, —CH₂CH₂CH₂SCH₃, —CH₂—S—CH₂CH(NH₂)—COOH, and —CH₂—S—S—CH₂CH(NH₂)—COOH;
R² is a residue selected from the group consisting of: a residue of γ-Glu (—CO—CH₂—CH₂—CH(NH₂)—COOH), and β-Asp (—CO—CH₂—CH(NH₂)—COOH) and wherein when R1 comprises sulfur, the compound is a sulfide, or a disulfide formed of two different or identical compounds according to formula I linked via the sulfide groups in two R1 residues.

2. A method according to claim 1 wherein R¹ is selected from the group consisting of —CH₂SH, —CH₂CH₂SH, and —CH₂CH₂CH₂SH.

3. A method according to claim 2 wherein R¹ is —CH₂SH.

4. A method according to claim 1 wherein R¹ is selected from the group consisting of —CH₂SCH₃, 13 CH₂CH₂S CH₃, and —H₂CH₂CH₂S CH₃.

5. A method according to claim 1 wherein R² is —CO—CH₂—CH₂—CH(NH₂)—COOH.

6. A method according to claim 1 wherein R² is —CO—CH₂—CH(NH₂)—COOH.

7. A method according to claim 1 wherein the flavour is a kokumi flavor.

8. A method for imparting a kokumi flavour to a consumable, comprising the addition of one or more compounds according to formula (I) according to claim 1, or salt thereof, to a consumable in a concentration sufficient to impart a kokumi flavour.

9. A method according to claim 8, wherein the one or more compounds of formula (I) or salt thereof according to claim 1, are present within the consumable in a concentration of 1 to 25.000 ppm (weight/weight).

10. A method according to claim 8 wherein the compound according to formula (I) according to claim 1, or salt thereof, is added in form of an unpurified enzymatic reaction mixture in which it was formed, in form of a crude extract of such a mixture, in form of a plant extract, in form of a plant isolate, or in purified form.

11. A consumable according to claim 9, wherein the consumable is selected from cereal products, baker's products, bread products, gums, chewing gums, yeast products, salt and spice products, mustard products, vinegar products, sauces (condiments), soups, processed foods, cooked fruits and vegetable products, meat and meat products, egg products, milk and dairy products, cheese products, butter and butter substitute products, milk substitute products, soy products, edible oils and fat products, medicaments, beverages, alcoholic drinks, beers, soft drinks, food extracts, plant extracts, meat extracts, condiments, sweeteners, nutraceuticals, pharmaceutical and non-pharmaceutical gums, tablets, lozenges, drops, emulsions, elixirs, syrups and other preparations for making beverages, instant beverages and effervescent tablets.

* * * * *